(12) United States Patent
Koch et al.

(10) Patent No.: US 10,539,205 B2
(45) Date of Patent: Jan. 21, 2020

(54) GEAR MECHANISM FOR AN ANTI-ROLL STABILIZATION MEANS OF A VEHICLE

(71) Applicants: Dr. Ing. h.c. F. Porsche Aktiengesellschaft, Stuttgart (DE); Schaeffler Technologies AG & Co. KG, Herzogenaurach (DE)

(72) Inventors: Thorsten Koch, Schwieberdingen (DE); Igor Illg, Renningen (DE); Wilfried Breton, Herzogenaurach (DE); Ramon Jurjanz, Herzogenaurach (DE); Tomas Smetana, Yokohama (JP)

(73) Assignees: Dr. Ing. h.c. F. Porsche Aktiengesellschaft (DE); Schaeffler Technologies AG & Co. KG (DE)

( * ) Notice: Subject to any disclaimer, the term of this patent is extended or adjusted under 35 U.S.C. 154(b) by 174 days.

(21) Appl. No.: 15/715,646

(22) Filed: Sep. 26, 2017

(65) Prior Publication Data

US 2018/0087602 A1 Mar. 29, 2018

(30) Foreign Application Priority Data

Sep. 27, 2016 (DE) .................. 10 2016 118 228

(51) Int. Cl.
*F16H 1/28* (2006.01)
*B60G 21/055* (2006.01)

(52) U.S. Cl.
CPC ........... *F16H 1/28* (2013.01); *B60G 21/0555* (2013.01); *B60G 2204/4191* (2013.01); *F16H 2001/289* (2013.01)

(58) Field of Classification Search
CPC .......... F16H 1/28; F16H 55/18; F16H 1/2863; B60G 21/0555
See application file for complete search history.

(56) References Cited

U.S. PATENT DOCUMENTS

| 2,845,809 | A | * | 8/1958 | Hetzel | .................. F16H 55/18 |
| | | | | | 29/463 |
| 8,313,411 | B2 | * | 11/2012 | Schafer | ................. F16H 1/2863 |
| | | | | | 475/331 |
| 9,587,711 | B2 | * | 3/2017 | Stocco | .................. F16H 1/2863 |
| 10,233,999 | B2 | * | 3/2019 | McCloy | ................ F16H 1/2863 |
| 2010/0240490 | A1 | | 9/2010 | Schafer | |

(Continued)

FOREIGN PATENT DOCUMENTS

| CN | 103161913 A | 6/2013 |
| CN | 103161915 A | 6/2013 |

(Continued)

OTHER PUBLICATIONS

German Search Report with partial English translation for German Application No. 10 2016 116 228.1, dated Jul. 10, 2017, 9 pages.

*Primary Examiner* — Patrick H Mackey
(74) *Attorney, Agent, or Firm* — RatnerPrestia

(57) ABSTRACT

A gear mechanism for an anti-roll stabilizer of a vehicle, having at least one planetary gear mechanism stage with a sun gear, an internal gear and at least two planetary clears, at least one planetary gear having a first planetary part and a second planetary part which are mounted coaxially and are connected to one another via a spring apparatus. The spring apparatus loads the two planetary parts with a prestressing force in an opposed manner in the circumferential direction.

8 Claims, 3 Drawing Sheets

(56) References Cited

U.S. PATENT DOCUMENTS

| | | | |
|---|---|---|---|
| 2013/0145878 A1* | 6/2013 | Kim | ............... C22C 33/0264 |
| | | | 74/445 |
| 2013/0150205 A1 | 6/2013 | Wu et al. | |
| 2014/0196557 A1 | 7/2014 | Stocco | |
| 2015/0316135 A1 | 11/2015 | Schnölzer | |

FOREIGN PATENT DOCUMENTS

| | | | |
|---|---|---|---|
| DE | 19757433 A1 | 6/1999 | |
| DE | 102008009122 A1 | 8/2009 | |
| DE | 102008011147 A1 | 10/2009 | |
| DE | 102012211725 A1 | 6/2013 | |
| DE | 102014208268 B3 | 5/2015 | |
| DE | 102015202236 A1 | 8/2016 | |
| DE | 102015204166 A1 | 9/2016 | |
| DE | 102015206063 A1 | 10/2016 | |
| DE | 102015206064 A1 | 10/2016 | |
| WO | WO-03056141 A1 * | 7/2003 | ............... F01L 1/352 |

* cited by examiner

GEAR MECHANISM FOR AN ANTI-ROLL STABILIZATION MEANS OF A VEHICLE

CROSS-REFERENCE TO RELATED APPLICATION

This application claims priority to German Patent Application No. DE 10 2016 118 228.1, filed Sep. 27, 2016, the content of such application being incorporated by reference herein in its entirety.

FIELD OF THE INVENTION

The present invention relates to a gear mechanism for an anti-roll stabilization means of a vehicle, and to a method for assembling a gear mechanism of this type.

BACKGROUND OF THE INVENTION

It is known that vehicles can be equipped with anti-roll stabilization means. Here, a stabilization means of this type relates, in particular, to the driving behavior in driving situations, in which corresponding actions of force on the chassis of a vehicle would produce an oscillation or a rolling behavior of the vehicle. In order to counteract a rolling behavior of this type of the vehicle, anti-roll stabilization means are known in vehicles, which anti-roll stabilization means can usually move corresponding stabilization masses into different positions with the aid of a motor. Anti-roll bars or anti-roll bar halves of this type are actuated correspondingly by way of the motor depending on the current driving situation, and in this way can counteract the rolling movements which are caused, with the result that the actual rolling movement of the vehicle is reduced considerably or is even suppressed completely.

It is disadvantageous in the case of the known solutions that, in the case of the transmission of the motor force to the corresponding anti-roll bar halves, gear mechanisms are used which have a free play. The free play which is present in a manner caused by the assembly leads to relative movements being possible within the gear mechanism between the individual gear mechanism gears depending on the current actuating situation. It is possible in this way that oscillations which are caused, as a result of the operation of the vehicle or other oscillation generators, produce a corresponding oscillation which is caused within the gear mechanism. An oscillation of this type which is caused can be transmitted further into the vehicle and can be perceived there as noise emission. Noise emissions are fundamentally undesirable within the vehicle and should therefore be suppressed as far as possible. In the case of the known solutions, this can be achieved exclusively by the fact that the anti-roll stabilization means is incorporated into the vehicle with increased insulation. This leads to increased technical complexity, to increased installation space and ultimately also to considerably higher weight.

SUMMARY OF THE INVENTION

It would be desirable to reduce the oscillation capability of the gear mechanism in an inexpensive and simple way, in particular to minimize the free play within the gear mechanism.

It goes without saying here that features and details which are described in conjunction with the gear mechanism according to aspects of the invention also apply in conjunction with the method according to aspects of the invention, and in each case vice versa, with the result that reference is always made or can always be made mutually with regard to the disclosure in respect of the individual aspects of the invention.

A gear mechanism according to aspects of the invention serves for anti-roll stabilization of a vehicle. For this purpose, the gear mechanism has at least one planetary gear mechanism stage with a sun gear, internal gear and at least two planetary gears. A gear mechanism according to aspects of the invention is also distinguished by the fact that at least one planetary gear has a first planetary part and a second planetary part. Said two planetary parts are mounted coaxially and are connected to one another via a spring apparatus. Here, the spring apparatus loads the two planetary parts with a prestressing force in an opposed manner in the circumferential direction.

A gear mechanism to aspects of the invention serves, within the anti-roll stabilization means, to transmit a motor force from a drive motor to corresponding anti-roll bar weights or anti-roll bar halves. For this purpose, a gear mechanism of this type is equipped, for example, with an input shaft and an output shaft, with the result that a corresponding transmission ratio is provided between the input shaft and the output shaft by way of gearwheels which engage into one another. A gear mechanism according to aspects of the invention is equipped with at least one planetary gear mechanism stage. Each planetary gear mechanism stage, in particular the at least one planetary gear mechanism stage, is equipped with an internal gear and a sun gear, at least two planetary gears which are arranged between the sun gear and the internal gear being provided. It goes without saying that a higher number of planetary gears, in particular three planetary gears, can also be used in the planetary gear mechanism stage within the context of the present invention. Here, a planetary gear mechanism stage can be used in a gear mechanism according to aspects of the invention in a manner which is combined with conventional simple gear mechanism stages and also with further planetary gear mechanism stages.

It is then a concept of the present invention that at least one planetary gear of the at least one planetary gear mechanism stage is divided into a first planetary part and at least one second planetary part. This means that each planetary part per se has a circulating toothing system which meshes both with the sun gear and with the internal gear in a corresponding way for the functional configuration of the planetary gear mechanism stage. The two planetary parts are mounted coaxially, with the result that they have a common rotational axis. This leads to the two planetary parts also preferably having identical diameters, with the result that corresponding common meshing in the same sun gear and the same internal gear can be provided. The two planetary parts are arranged offset from one another along the common rotational axis, with the result that a connection can correspondingly be provided between the two planetary parts with the aid of the spring apparatus.

It is then ensured for the connection between the two planetary parts that loading with a prestressing force can be provided. It is then possible with the aid of a spring apparatus to load the two planetary parts with a prestressing force. Here, the direction of said prestressing force is oriented in the circumferential direction of the two planetary parts, that is to say in the direction of the respective rotation of the planetary part or the planetary gear. It is decisive here that the two planetary parts are loaded with the prestressing force in an opposed direction. For example, the first planetar part is loaded with the prestressing force in the clockwise direction, and the second planetary part is loaded with the prestressing force counter to the clockwise direction. It goes without saying that the reverse loading direction of the two planetary parts is also readily possible within the context of the present invention. The opposed loading of the prestress leads to said prestressing force acting on the two planetary parts in the circumferential direction, that is to say tangentially on said planetary parts. This leads to, as it were, the two planetary parts being rotated apart from one another or prestressed apart from one another in the opposed direction in the circumferential direction. Since pushing of the individual teeth into meshing engagement is necessary for inserting the planetary gear into the meshing situation between the sun gear and the internal gear, a free play remains here between the teeth in the meshing insertion. As a result of the introduction of the prestressing force, a relative rotation between the first planetary part and the second planetary part can then be provided, which relative rotation is produced or set by way of said prestressing force. In this way, the relative situation with respect to the one flank of a tooth in engagement of a first planetary part and on the opposite flank of the corresponding engaging tooth of the second planetary part will bring about pressing apart of said two teeth to produce a reduction of the free play with respect to the respective sun gear or with respect to the respective internal gear. Overall, by way of being pressed apart, the tooth of the planetary gear is therefore as it were widened in lateral view by way of the division of said tooth between a first planetary part and a second planetary part, and the free play in meshing engagement with respect to the internal gear and with respect to the sun gear is reduced considerably in this way.

The excitation probability within the gear mechanism is reduced considerably as a result of the reduction of the free play by way of the use of a spring apparatus according to aspects of the invention. Even at exciting frequencies during operation of the vehicle, the reduction of the free play in this way leads to said exciting frequencies being capable of being manifested to a considerably lesser extent in excited oscillation of the gear mechanism itself. This leads to it being possible for the gear mechanism itself to be operated with considerably less noise than is the case in conventional gear mechanisms with a large free play. It is to be noted, furthermore, that it goes without saying that a reverse rotation of the two planetary parts with respect to one another can also take place counter to the spring apparatus, with the result that the assembly capability of a gear mechanism of this type is not impaired in any way at all by way of the configuration according to aspects of the invention. Rather, the assembly can take place in the same way as is provided in the case of already existing gear mechanisms.

It can be advantageous if, in the case of a gear mechanism according to aspects of he invention, the first planetary part and the second planetary part have a rotational offset with respect to one another in the prestressed state. As has already been explained, said rotational offset can already be set by way of the prestress, with the result that the spring apparatus as it were produces said relative rotation between the first planetary part and the second planetary part. This can be both a fixedly set rotational offset and a freely adjustable rotational offset. The greater the rotational offset, the greater the possibility to compensate for free play. The greater therefore the free play which is formed between the individual teeth of the planetary gear and the meshing teeth of the internal gear or the sun gear, the more that the rotational offset can also be selected to be greater, in order to again minimize said free play accordingly. This therefore means that, in particular, the toothing system of the planetary parts can be configured to be smaller and therefore with a deliberately provided free play, since, for facilitated assembly capability, said free play can be reduced again by way of the spring apparatus for later use. A rotational offset of this type relates here, in particular, to a rotational offset of at most approximately 10% of the tooth spacing of the respective planetary part. Here, the same toothing system with an identical tooth spacing and identical tooth geometry is preferably provided in the case of each planetary part. It is also possible, moreover, to define the rotational offset using the free play. If a defined gap size is predefined as free play, the rotational offset which is set by way of the prestress as a relative rotation between the two planetary parts is preferably smaller than or equal to said defined free play. A configuration which is smaller than and not equal to the free play is preferred, in order to avoid an exact interference fit and for it to be possible to make clean meshing possible without increased friction between the individual toothing systems despite the reduction of the free play in the sense of a clearance fit.

Furthermore, it can be advantageous if, in the case of a gear mechanism according to aspects of the invention, all the planetary gears of the at least one planetary gear mechanism stage have a first planetary part and a second planetary part which are mounted coaxially and are connected to one another via a spring apparatus, the spring apparatus loading the two planetary parts with a prestressing force in an opposed manner in the circumferential direction. In other words, all planetary gears of a planetary gear mechanism stage are configured according to aspects of the invention here, with the result that the reduction of the free play and the corresponding positive effect on lower-noise operation can be achieved with greater reliability and with a pronounced effect. It goes without saying that, in the case of a multiple-stage gear mechanism in a way according to aspects of the invention, at least one planetary gear or at least two, preferably all planetary gear mechanism stages can also be configured in a way according to aspects of the invention. It can also be preferred for the maximum benefit of all advantages of the present invention if, in the case of all planetary gear mechanism stages, all the planetary gears are configured in a way according to aspects of the invention.

It is likewise advantageous if, in the case of a gear mechanism according to aspects of the invention, the spring apparatus has a first contact face for loading the first planetary part with the prestressing force and/or a second contact face for loading the second planetary part with the prestressing force. In other words, the spring apparatus is preferably configured completely separately from the two planetary parts. This leads to facilitated production and facilitated assembly, in particular, of the two planetary parts. Here, the introduction of the prestressing force can be provided via, the contact face and the countercontact face which is still to be described later, which contact faces serve as it were as a force stop for the introduction of the prestressing force. Here, the contact faces are preferably countercontact faces which correspond to the geometric configuration, with the result that a full surface area contact can provide the corresponding force transmission of the prestressing force. In addition to contact faces and countercontact faces of planar configuration, it goes without saying that curved, angled or freely shaped face configurations of the contact faces and countercontact faces are also conceivable within the context of the present invention.

It can be advantageous, furthermore, if, in the case of a gear mechanism according to aspects of the invention, the first planetary part has a first countercontact face for receiving the prestressing force from the first contact face, and/or the second planetary part has a second countercontact face for receiving the prestressing force from the second contact face. Here, there is also preferably again a separate configuration of the spring apparatus from the two planetary parts, with the result that both first and second contact faces are in engagement with corresponding first and second countercontact faces. Simple assembly also takes place here, since the force-transmitting state for the introduction of the prestressing force can be achieved by way of simple contact of the respective contact face with the associated countercontact face.

It is a further advantage if, in the case of a gear mechanism according to aspects of the invention, the first contact face extends radially or substantially radially with the first countercontact face, and/or the second contact face extends radially or substantially radially with the second countercontact face. Here, the radial extent relates to the rotational axis of the two planetary parts which are oriented coaxially with respect to one another. The radial extent leads, furthermore, to it being possible for the prestressing force which is oriented in the circumferential direction to be transmitted via the contact faces and the countercontact faces substantially in a perpendicular way. This leads to a substantially friction-free and, in particular, translational movement-free transmission, with the result that the friction forces, relative forces and, in particular, shear forces in the spring apparatus and the planetary parts can be reduced or even completely avoided.

It is likewise advantageous if, in the case of a gear mechanism according to aspects of the invention, the first countercontact face and/or the second countercontact face are/is configured as an axial projection, in particular in the form of a cam, on the respective planetary part. A cam of this type therefore projects axially on the respective planetary part and then serves to configure the corresponding countercontact face, in order to make an introduction of the prestressing force possible. Here, it goes without saying that the corresponding cams of both planetary parts can be arranged offset rotationally with respect to one another, with the result that the introduction of the prestressing force can take place at different locations in accordance with the geometric adaptation of the spring apparatuses and in accordance with the rotational offset of the two first and second contact faces. For instance, the spring apparatus can have a circular segment or a circular ring segment, in the case of which the contact faces point in different direction and the circular ring segment is closed in the region between 270° and 350°. This leads to introduction situations which are oriented in a correspondingly opposed manner for the prestressing force into the two planetary parts. Moreover, a substantially wedge-shaped orientation of the contact faces and the countercontact faces is achieved by way of the radial configuration, which wedge-shaped orientation further facilitates pushing on and setting or calibrating of the prestressing force.

It is likewise advantageous if, in the case of a gear mechanism according to aspects of the invention, the spring apparatus is connected fixedly to one of the two planetary parts. A fixed connection can be carried out, for example, by way of adhesive bonding, welding, clamping or reversible connections, such as screwing or riveting. Here, both a fixedly predefined relative position with a fixedly set and defined prestressing force can be used; it is also conceivable that corresponding setting of a variable prestressing force becomes possible during the connection or during the configuration of a connection of this type. This can equate, in particular, to a corresponding relative rotation of the two planetary parts with respect to one another, with the result that the corresponding prestressing force can be varied in a manner which is dependent on the sin of the relative position.

A further advantage can be achieved if, in the case of a gear mechanism according to aspects of the invention, the spring apparatus has a circling for loading the planetary parts with the prestressing force. This is a particularly inexpensive and simple embodiment, in order to provide the corresponding prestressing force. By way of the planar configuration of a circling of this type which is provided as a circle segment, it is possible, moreover, to provide a particularly flat configuration, in order to keep the axial extent of the split planetary gear particularly compact.

A method for assembling a gear mechanism according to aspects of the invention is likewise the subject matter of the present invention, having the following steps:
connecting of the first planetary part to the second planetary part of at least one planetary gear for a spring apparatus,
loading of the two planetary parts with a prestressing force in an opposed direction by means of the spring apparatus,
inserting of the planetary gear in the prestressed state into meshing engagement between the sun gear and the internal gear.

As a result of the assembly of a gear mechanism according to aspects of the invention, a method according to aspects of the invention has the same advantages as have been described in detail in relation to a gear mechanism according to aspects of the invention. In particular, it becomes clear here that known assembly methods can also be used, in order to insert the planetary gear in its prestressed state into the meshing situation. According to aspects of the invention, the two steps of connecting and loading with the prestress then take place before this, with the result that the known assembly methods can subsequently be used without a further modification.

BRIEF DESCRIPTION OF THE DRAWINGS

Further advantages, features and details of the invention result from the following description, in which exemplary embodiments of the invention are described in detail with reference to the drawings. Here, the features which are mentioned in the claims and in the description can be essential to the invention in each case individually per se or in any desired combination. In the drawings, diagrammatically;

DETAILED DESCRIPTION OF THE INVENTION

Figure 1:
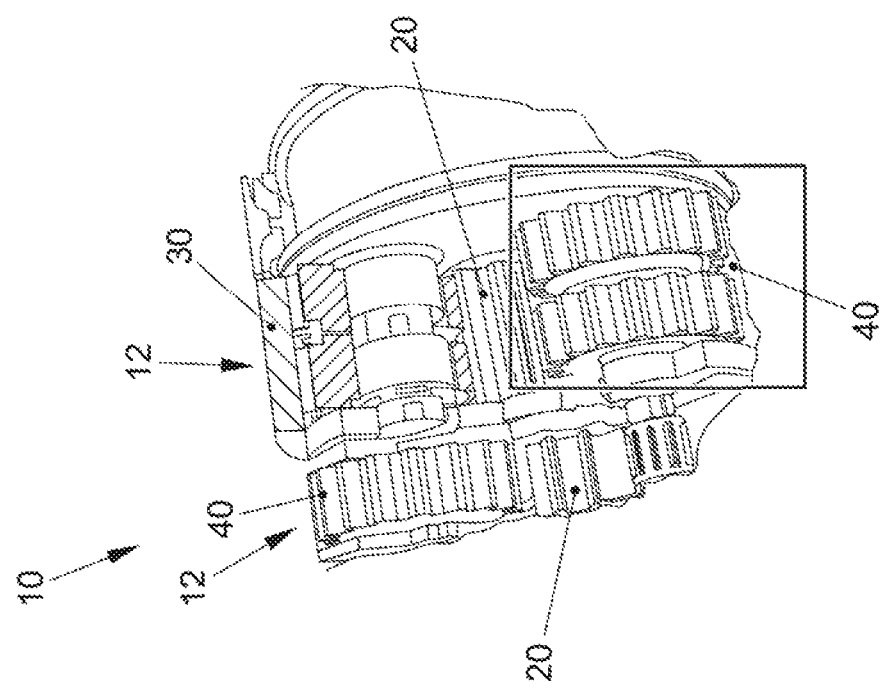
FIG. 1 shows a gear mechanism according to aspects the invention.

FIG. 1 diagrammatically shows how a multiple-stage gear mechanism 10 can be equipped with two planetary gear mechanism stages 12 here. Said gear mechanism is used, in order to transmit a corresponding rotational force from a motor to anti-roll bar halves for the anti-roll stabilization of a vehicle. Here, a planetary gear mechanism stage 12 according to aspects of the invention is provided in addition to a known planetary gear mechanism stage 12 of simple construction on the left-hand side, in the case of which planetary gear mechanism stage 12, a split planetary gear 40 is provided and meshes with a sun gear 20 and an internal gear 30.

Figure 2:
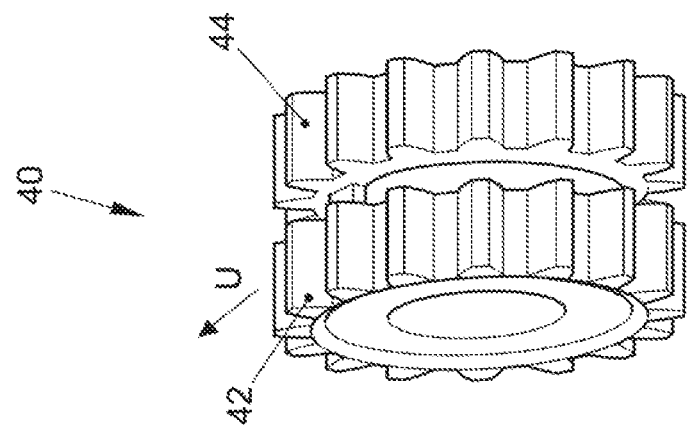
FIG. 2 shows an isolated illustration of a planetary gear the gear mechanism in accordance with FIG. 1.

FIG. 2 shows said split planetary gear 40 in an enlarged illustration; the individual planetary parts 42 and 44 can be seen dearly here. A small arrow illustrates the circumferential direction U, in which the prestressing force of a spring apparatus 46 is introduced.

Figure 3:
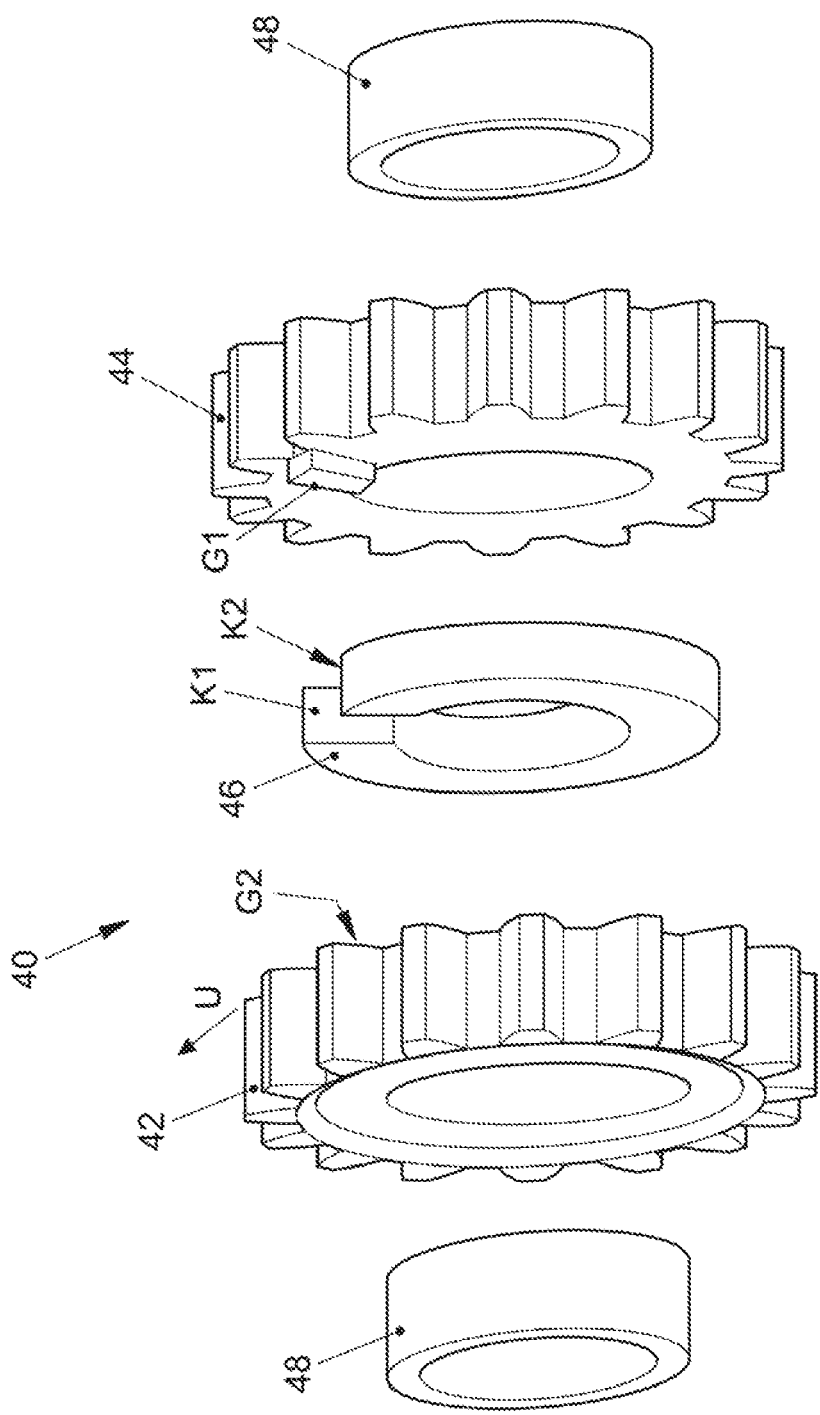
FIG. 3 shows the planetary gear in accordance with FIG. 2 in are exploded illustration.

FIG. 3 shows the planetary gear 40 from FIG. 2 in an exploded illustration. The two planetary parts 42 and 44 are shown separated from one another, and the two bearing rings 48 for the rotational mounting of the planetary gear 40 are likewise depicted. A spring apparatus 46 which is configured as a planar circle segment with correspondingly a first contact face K1 and a second contact face K2 is then shown centrally between the two planetary parts 42 and 44. Countercontact faces G1 and G2 are also provided on the two planetary parts 42 and 44 via a cam-like projection.

Figure 4:
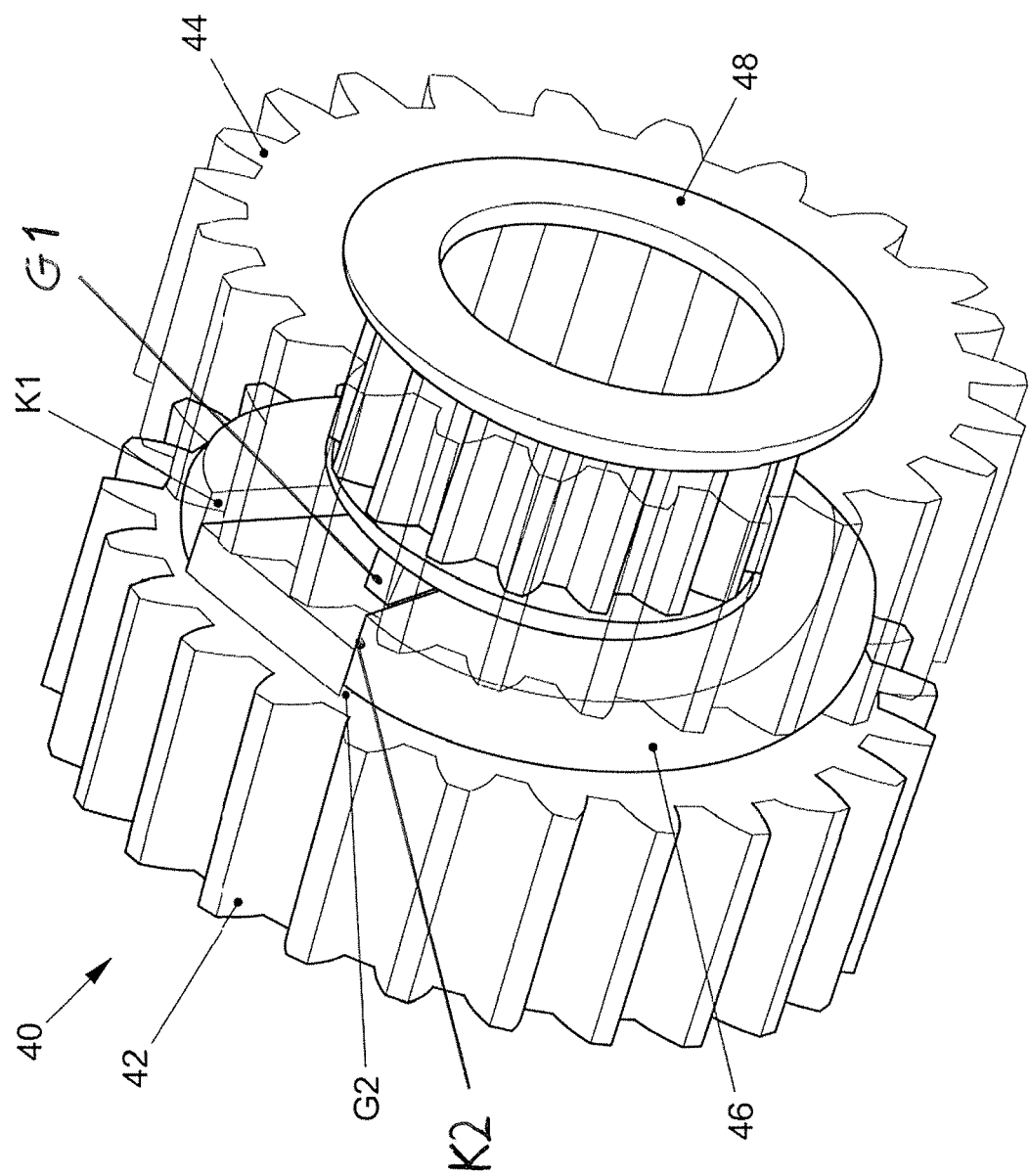
FIG. 4 shows a further embodiment of a planetary gear of a gear mechanism according to aspects of the invention.

FIG. 4 shows the correlation for the introduction of the prestressing force of the spring apparatus 46, which prestressing force is oriented in the circumferential direction U. It can thus be seen clearly here that a planar contact for introducing the prestressing force into the first planetary part 42 becomes possible, for example, by way of the correlation of the cam-like projection and therefore the contact face K1 with the countercontact face G1. In this way, a relative rotation of the two planetary parts 42 and 44 with respect to one another can take place, in order for it to be possible to provide correspondingly free play between the individual meshing teeth with respect to the sun gear 20 and with respect to the internal gear 30.

The preceding description of the exemplary embodiments describes the present invention exclusively within the context of examples. It goes without saying that individual embodiments can be combined freely with one another, insofar as technically appropriate.

What is claimed is:

1. A gear mechanism for an anti-roll stabilizer of a vehicle, the gear mechanism having at least one planetary gear mechanism stage with (i) a sun gear, (ii) an internal gear and (iii) at least two planetary gears,
   wherein at least one planetary gear of the at least two planetary gears has a first planetary part and a second planetary part which are mounted coaxially and are connected to one another via a spring apparatus,
   the spring apparatus loading the two planetary parts with a prestressing force in an opposed manner in a circumferential direction,
   wherein the spring apparatus has a first contact face for loading the first planetary part with the prestressing force and a second contact face for loading the second planetary part with the prestressing force,
   wherein the first planetary part has a first countercontact face for receiving the prestressing force from the first contact face, and the second planetary part has a second countercontact face for receiving the prestressing force from the second contact face, and
   wherein the countercontact faces of the planetary parts span across the contact faces of the spring apparatus by different distances.

2. The gear mechanism as claimed in claim 1, wherein the first planetary part and the second planetary part have a rotational offset with respect to one another in a prestressed state.

3. The gear mechanism as claimed in claim 1, wherein the first contact face extends radially or substantially radially with the first countercontact face, and the second contact face extends radially or substantially radially with the second countercontact face.

4. The gear mechanism as claimed in claim 1, wherein the first countercontact face and the second countercontact face are configured as an axial projection on the respective planetary part.

5. The gear mechanism as claimed in claim 4, wherein the axial projection is a cam.

6. The gear mechanism as claimed in claim 1, wherein the spring apparatus is connected fixedly to one of the two planetary parts.

7. The gear mechanism as claimed in claim 1, wherein the spring apparatus has a circlip for loading the planetary parts with the prestressing force.

8. The gear mechanism as claimed in claim 1, wherein, in one position of the gear mechanism, one of the countercontact faces extends between and contacts both contact faces of the spring apparatus, while the other countercontact face contacts only one of the contact faces of the spring apparatus.

* * * * *